US012266323B2

(12) United States Patent
Li et al.

(10) Patent No.: US 12,266,323 B2
(45) Date of Patent: Apr. 1, 2025

(54) DISPLAY PANEL AND DRIVING METHOD THEREOF, AND ELECTRONIC DEVICE

(71) Applicant: HKC CORPORATION LIMITED, Shenzhen (CN)

(72) Inventors: Jianlei Li, Guangdong (CN); Lidan Ye, Guangdong (CN)

(73) Assignee: HKC CORPORATION LIMITED, Shenzhen (CN)

(*) Notice: Subject to any disclaimer, the term of this patent is extended or adjusted under 35 U.S.C. 154(b) by 0 days.

(21) Appl. No.: 18/677,433

(22) Filed: May 29, 2024

(65) Prior Publication Data

US 2025/0014533 A1 Jan. 9, 2025

(30) Foreign Application Priority Data

Jul. 6, 2023 (CN) ......................... 202310820377.0

(51) Int. Cl.
*G09G 3/36* (2006.01)

(52) U.S. Cl.
CPC ......... *G09G 3/3677* (2013.01); *G09G 3/3688* (2013.01); *G09G 2300/0852* (2013.01); *G09G 2330/021* (2013.01)

(58) Field of Classification Search
CPC ... G09G 2300/0842; G09G 2310/0251; G09G 2310/06; G09G 2320/0214
See application file for complete search history.

(56) References Cited

U.S. PATENT DOCUMENTS

| | | | | |
|---|---|---|---|---|
| 8,243,108 B2 * | 8/2012 | Chen | G09G 3/3614 | 345/694 |
| 10,908,736 B2 * | 2/2021 | Yang | G06F 3/0418 | |
| 2008/0013007 A1 | 1/2008 | Yokoyama et al. | | |
| 2008/0036786 A1 * | 2/2008 | Tajiri | G09G 3/3659 | 345/596 |

(Continued)

FOREIGN PATENT DOCUMENTS

| | | |
|---|---|---|
| CN | 1476239 A | 2/2004 |
| CN | 101123060 A | 2/2008 |

(Continued)

OTHER PUBLICATIONS

Notice of allowance issued in corresponding CN application No. 202310820377.0 dated Aug. 21, 2023.

*Primary Examiner* — Van N Chow
(74) *Attorney, Agent, or Firm* — HAUPTMAN HAM, LLP

(57) ABSTRACT

The present disclosure provides a display panel, a driving method therefor, and an electronic device. The display panel includes multiple second scan lines, a pixel circuit further includes a second switch unit and a neutralizing capacitor, a control end of the second switch unit is electrically connected to a second scan line, a first terminal of the second switch unit is electrically connected to a second terminal of a first switch unit, and a second terminal of the second switch unit is electrically connected to one terminal of the neutralizing capacitor, and the other end of the neutralizing capacitor is electrically connected to a second common electrode. The control circuit is configured to obtain a display signal, and charges liquid crystal capacitors, storage capacitors, and neutralizing capacitors in each row according to the display signal, to enable the display panel to displays a frame at a first frequency.

14 Claims, 5 Drawing Sheets

(56) References Cited

U.S. PATENT DOCUMENTS

2009/0141204 A1* 6/2009 Numao ................ G09G 3/3659
349/39

FOREIGN PATENT DOCUMENTS

| | | | |
|---|---|---|---|
| CN | 201222151 | Y | 4/2009 |
| CN | 101460989 | A | 6/2009 |
| CN | 102184717 | A | 9/2011 |
| CN | 103488014 | A | 1/2014 |
| TW | 201015521 | A | 4/2010 |

* cited by examiner

DISPLAY PANEL AND DRIVING METHOD THEREOF, AND ELECTRONIC DEVICE

CROSS-REFERENCE TO RELATED APPLICATIONS

This application claims priority under 35 U.S.C. § 119 (a) to Chinese Patent Application No. 202310820377.0, filed Jul. 6, 2023, the entire disclosure of which is incorporated herein by reference.

TECHNICAL FIELD

The present disclosure relates to the field of display technology, and more particularly to a display panel, a driving method thereof, and an electronic device.

BACKGROUND

Display technology has been one of the important research directions in electronic devices. With the development of display technology, users have increasingly higher requirements on a refresh rate of display images. At present, there are mainly two implementations of a display panel with a high refresh rate. For example, a signal source directly sends display data with a high refresh rate, and the display panel directly displays images at a high refresh rate according to the display data with the high refresh rate. Alternatively, the signal source sends display data with a low refresh rate, and then the display data is processed by a driver circuit in the display panel, and the processed display data with a multiplied frequency is sent to the display panel for display. However, the above two implementations of high refresh rate have higher requirements on the chip specification, higher costs, and higher power consumption.

SUMMARY

According to a first aspect, the present disclosure provides a display panel. The display panel includes multiple first scan lines extending in a first direction, multiple data lines extending in a second direction, a control circuit, and multiple pixel circuits defined by intersection of the multiple first scan lines and the multiple data lines. Each of the multiple pixel circuits includes a first switch unit, a liquid crystal capacitor, and a storage capacitor. A control terminal of the first switch unit is electrically connected to one of the multiple first scan lines, a first terminal of the first switch unit is electrically connected to one of the multiple data lines, a second terminal of the first switch unit is electrically connected to one terminal of the liquid crystal capacitor and one terminal of the storage capacitor, the other terminal of the liquid crystal capacitor is electrically connected to a first common electrode, and the other terminal of the storage capacitor is electrically connected to a second common electrode. The display panel further includes multiple second scan lines extending in the first direction, and each of the multiple pixel circuits further includes a second switch unit and a neutralizing capacitor. A control terminal of the second switch unit is electrically connected to one of the multiple second scan lines, a first terminal of the second switch unit is electrically connected to the second terminal of the first switch unit, a second terminal of the second switch unit is electrically connected to one terminal of the neutralizing capacitor, and the other terminal of the neutralizing capacitor is electrically connected to the second common electrode. The control circuit is configured to obtain a display signal and charge each row of liquid crystal capacitors, storage capacitors, and neutralizing capacitors according to the display signal and neutralize charges of the liquid crystal capacitor, the storage capacitor, and the neutralizing capacitor during displaying of a frame to enable the display panel to display images at a first frequency, the display signal has a second frequency, and the first frequency is greater than the second frequency.

According to a second aspect, the present disclosure provides a driving method for a display panel. The driving method is applicable to the display panel in the first aspect and includes the following. A display signal is obtained. A liquid crystal capacitor, a storage capacitor, and a neutralizing capacitor in each of pixel circuits in each row is charged according to the display signal. Charges of the liquid crystal capacitor, the storage capacitor, and the neutralizing capacitor are neutralized during displaying of a frame to enable the display panel to display images at a first frequency. The display signal has a second frequency, and the first frequency is greater than the second frequency.

According to a second aspect, the present disclosure provides an electronic device. The electronic device includes a housing and a display panel. The housing is configured to carry the display panel. The display panel includes multiple first scan lines extending in a first direction, multiple data lines extending in a second direction, a control circuit, and multiple pixel circuits defined by intersection of the multiple first scan lines and the multiple data lines. Each of the multiple pixel circuits includes a first switch unit, a liquid crystal capacitor, and a storage capacitor. A control terminal of the first switch unit is electrically connected to one of the multiple first scan lines, a first terminal of the first switch unit is electrically connected to one of the multiple data lines, a second terminal of the first switch unit is electrically connected to one terminal of the liquid crystal capacitor and one terminal of the storage capacitor, the other terminal of the liquid crystal capacitor is electrically connected to a first common electrode, and the other terminal of the storage capacitor is electrically connected to a second common electrode. The display panel further includes multiple second scan lines extending in the first direction, and each of the multiple pixel circuits further includes a second switch unit and a neutralizing capacitor. A control terminal of the second switch unit is electrically connected to one of the multiple second scan lines, a first terminal of the second switch unit is electrically connected to the second terminal of the first switch unit, a second terminal of the second switch unit is electrically connected to one terminal of the neutralizing capacitor, and the other terminal of the neutralizing capacitor is electrically connected to the second common electrode. The control circuit is configured to obtain a display signal and charge each row of liquid crystal capacitors, storage capacitors, and neutralizing capacitors according to the display signal and neutralize charges of the liquid crystal capacitor, the storage capacitor, and the neutralizing capacitor during displaying of a frame to enable the display panel to display images at a first frequency, the display signal has a second frequency, and the first frequency is greater than the second frequency.

BRIEF DESCRIPTION OF THE DRAWINGS

To describe technical solutions of embodiments more clearly, the following will give a brief introduction to accompanying drawings used for describing embodiments or the related art. Apparently, the accompanying drawings hereinafter described are some embodiments of the disclosure. Based on these drawings, those of ordinary skill in the art can also obtain other drawings without creative effort.

first direction—D1, second direction—D2, first common electrode—VCOM, second common electrode—AVCOM, display panel—1, first scan line—11, data line—12, control circuit—13, pixel circuit—14, first switch unit—T1, control terminal—g, first terminal—s, second terminal—d, liquid crystal capacitor—C1, storage capacitor—C2, second switch unit—T2, neutralizing capacitor—C3, second scan line—15, first scan driver circuit—16, second scan driver circuit—17, data driver circuit—18, electronic device—2, and housing—21.

DETAILED DESCRIPTION

The following will clearly and completely illustrate technical solutions of embodiments of the disclosure with reference to the accompanying drawings of embodiments of the disclosure. Apparently, embodiments described herein are merely some embodiments, rather than all embodiments, of the disclosure. Based on the embodiments of the disclosure, all other embodiments obtained by those of ordinary skill in the art without creative effort shall fall within the protection scope of the disclosure.

Figure 1:
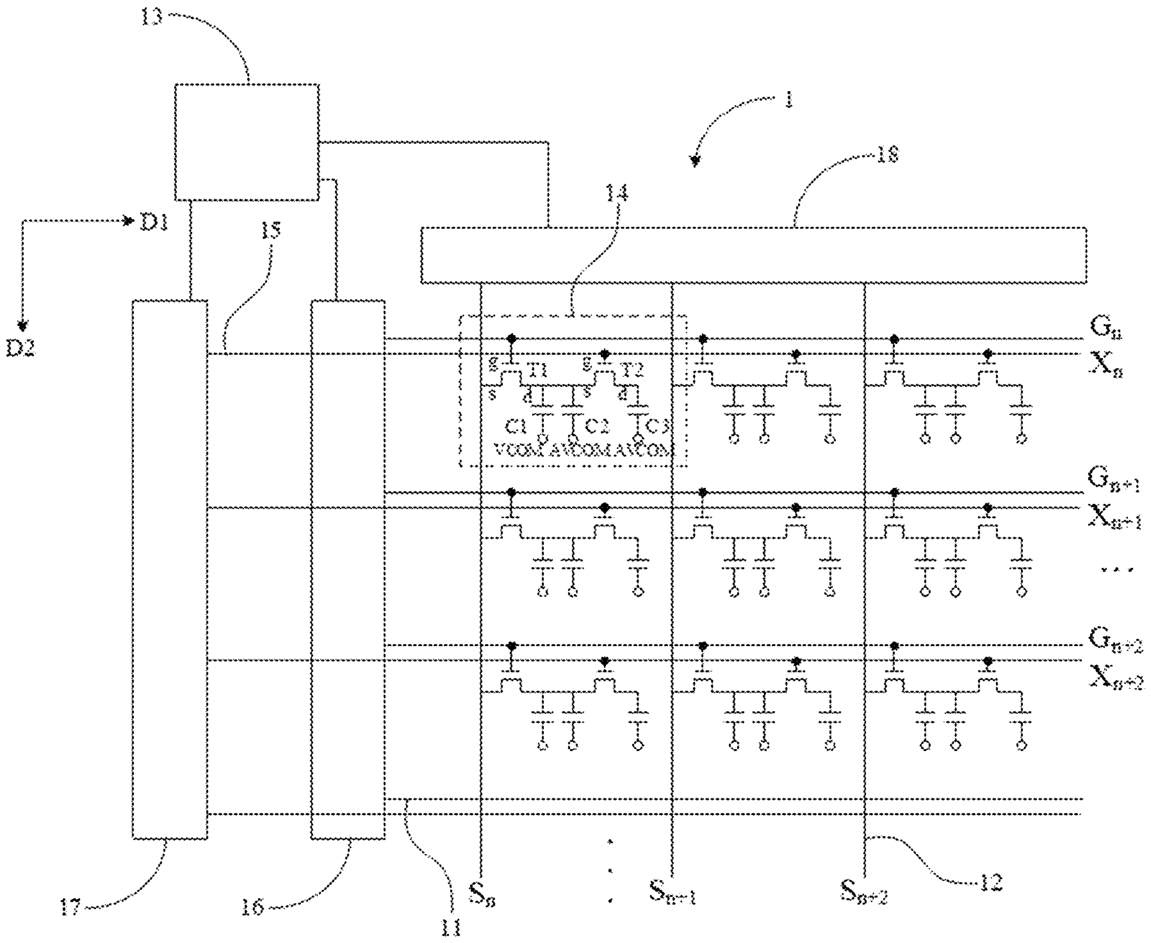
FIG. 1 is a schematic circuit diagram of a display panel provided in an embodiment of the present disclosure.

A display panel 1 is provided in the present disclosure. Reference is made to FIG. 1, which is a schematic circuit diagram of a display panel provided in an embodiment of the present disclosure. The display panel 1 includes multiple first scan lines 11 extending in a first direction D1, multiple data lines 12 extending in a second direction D2, a control circuit 13, and multiple pixel circuits 14 defined by intersection of the multiple first scan lines 11 and the multiple data lines 12. The pixel circuit 14 includes a first switch unit T1, a liquid crystal capacitor C1, and a storage capacitor C2. A control terminal g of the first switch unit is electrically connected to the scan line 11. A first terminal s of the first switch unit T1 is electrically connected to the data line 12, and a second terminal d of the first switch unit T1 is electrically connected to one terminal of the liquid crystal capacitor C1 and one terminal of the storage capacitor C2. The other terminal of the liquid crystal capacitor C1 is electrically connected to a first common electrode VCOM, and the other terminal of the storage capacitor C2 is electrically connected to a second common electrode AVCOM. The display panel 1 further includes multiple second scan lines 15 extending in the first direction D1, and the pixel circuit 14 further includes a second switch unit T2 and a neutralizing capacitor C3. A control terminal g of the second switching unit T2 is electrically connected to the second scan line 15, a first terminal s of the second switching unit T2 is electrically connected to the second terminal d of the first switching unit T1, a second terminal d of the second switch unit T2 is electrically connected to one terminal of the neutralizing capacitor C3, and the other terminal of the neutralizing capacitor C3 is electrically connected to the second common electrode AVCOM. The control circuit 13 is configured to obtain a display signal, and charges each row of liquid crystal capacitors C1, storage capacitors C2, and neutralizing capacitors C3 according to the display signal and neutralize charges of the liquid crystal capacitors C1, the storage capacitors C2, and the neutralizing capacitors C3 during displaying of a frame to enable the display panel 1 to display images at a first frequency. the display signal has a second frequency, and the first frequency is greater than the second frequency.

It may be noted that, the display panel 1 further includes a backlight source and a liquid crystal layer. The backlight source is configured to provide light. Two electrodes of the liquid crystal capacitor C1 are disposed at upper and lower sides of the liquid crystal layer, respectively. When the first switch unit T1 is turned on under loading of the scan signal transmitted on the first scan line 11, an electric field is generated between the two electrodes of the liquid crystal capacitor C1 under loading of a first common voltage signal transmitted by the first common electrode VCOM and a data signal transmitted by the data line 12, to control rotation angles of the liquid crystal molecules in the liquid crystal layer so as to adjust the light transmittance of the backlight source, so as to achieve a display function of the display pane 11. The storage capacitor C2 is configured to keep a voltage at one terminal of the liquid crystal capacitor C1 for a certain time after the data signal transmitted on the data line 12 stops charging the liquid crystal capacitor C1. A voltage of a common voltage signal transmitted by the first common electrode VCOM and a voltage of a common voltage signal transmitted by the second common electrode AVCOM may be the same, and may also be different. The first switch unit T1 and the second switch unit T2 each may be a P-type semiconductor metal oxide transistor or an N-type semiconductor metal oxide transistor, which is not limited in the present disclosure. As illustrated in FIG. 1, "Xn" denotes the second scan line of the nth row, "Gn" denotes the first scan line of the nth row of, and "Sn" denotes the data line of the $n^{th}$ column.

Figure 2:
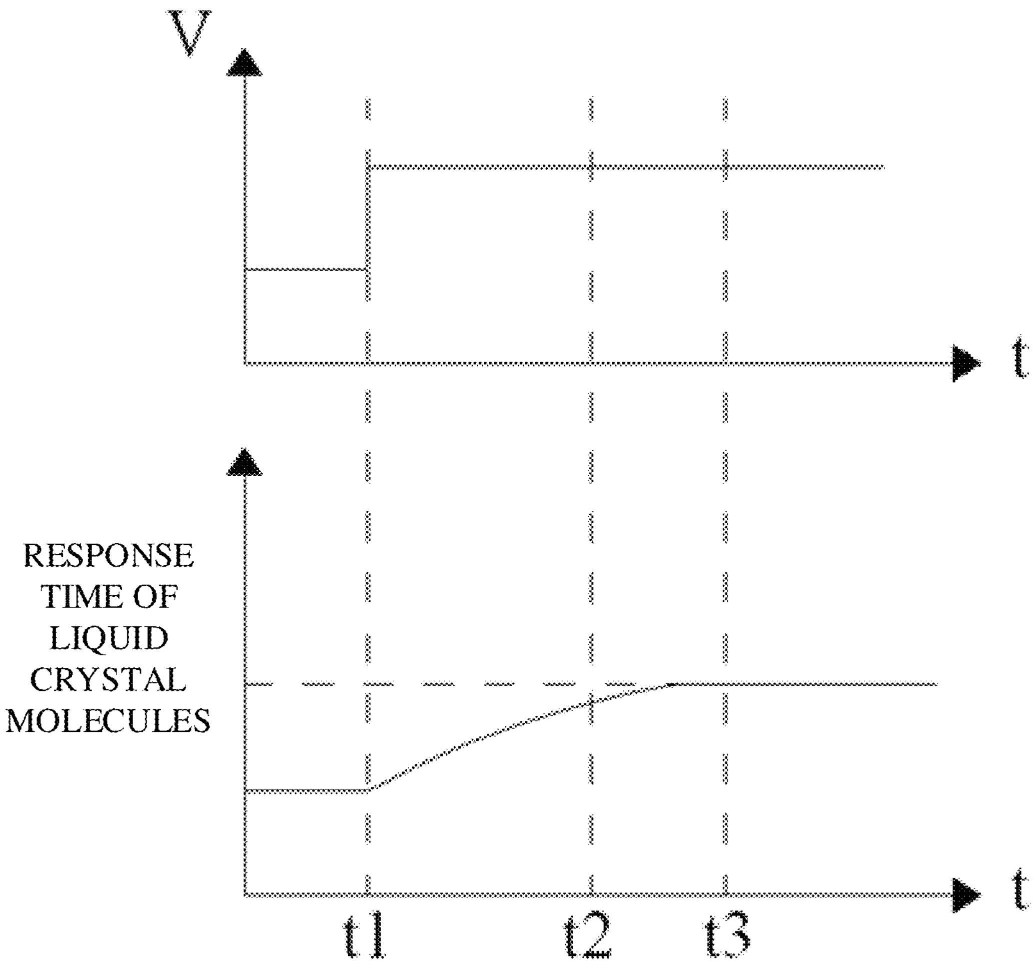
FIG. 2 is a schematic diagram of a drive waveform of 60 Hz provided in an embodiment of the present disclosure.
Figure 3:
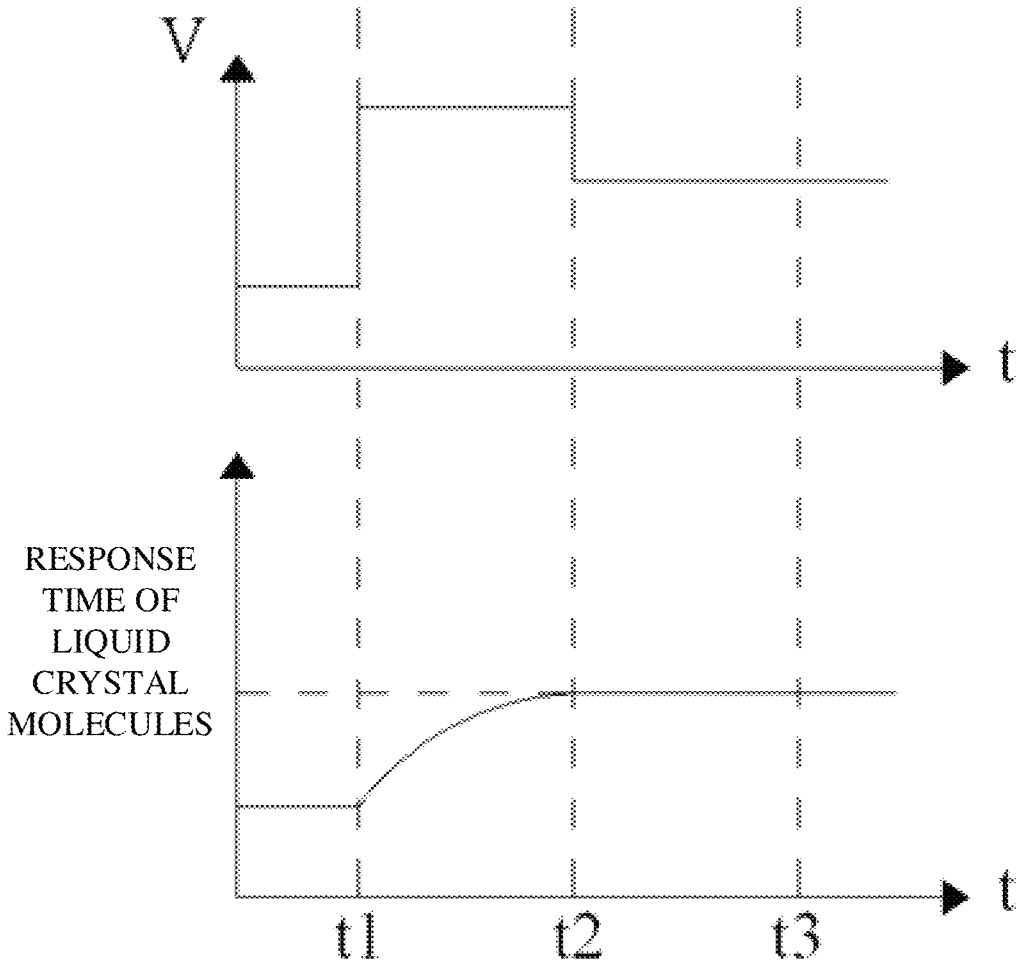
FIG. 3 is a schematic diagram of an overdrive waveform of 60 Hz provided in an embodiment of the present disclosure.
Figure 4:
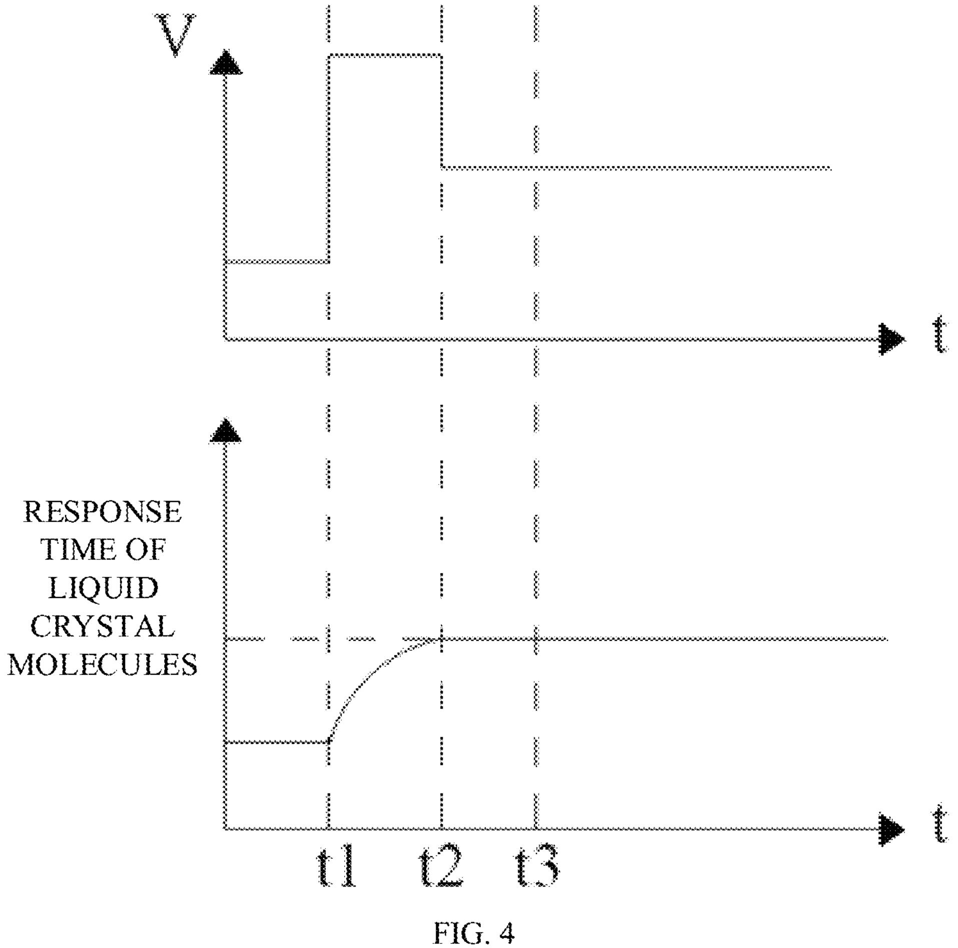
FIG. 4 is a schematic diagram of an overdrive waveform of 120 Hz provided in an embodiment of the present disclosure.

Reference is made to FIGS. 2 to 4 together, where FIG. 2 is a schematic diagram of a drive waveform of 60 Hz provided in an embodiment of the present disclosure, FIG. 3 is a schematic diagram of an overdrive waveform of 60 Hz provided in an embodiment of the present disclosure, and FIG. 4 is a schematic diagram of an overdrive waveform of 120 Hz provided in an embodiment of the present disclosure. The vertical coordinate "V" represents a voltage required for displaying a corresponding gray scale, and the horizontal coordinate "t" represents time. It may be noted that, one frame on the display panel 1 represents a display image finally formed after each row of the pixel circuits 14 is charged by the data signal transmitted on the data line 12. A duration before time t1 corresponds to the first frame on the display panel 1, and assuming that a display grayscale of the first frame is 20, a duration from the time t1 to time t2 corresponds to the second frame on the display panel 1, and the grey scale of the display signal of the second frame obtained by the control circuit 13 is 80. Without adopting an overdriving method, the gray scale of the data signal finally transmitted on the data line 12 is also 80, and the gray scale of the second frame on the display panel 1 is also 80. When the display panel 1 includes 2160 rows of the pixel circuits 14, a charging duration of each row of the pixel circuits 14 is taken as a unit duration, a duration for the display panel 1 to display a frame includes display durations for 2160 rows and pause durations for 90 rows, for a total of charging durations for 2250 rows. A proportion of the charging duration of one row of pixel circuits 14 to the duration of one frame is too low, the variation of the charging voltages of the pixel circuits 14 in one row is not illustrated in the figure, and thus can be regarded as instant switching of gray scale voltages. It may be understood that, although the gray scale voltage is instantly switched, the liquid crystal molecules require response time. As illustrated in FIG. 2, the frequency of the display signal is 60 Hz. At the time t1, the two electrodes of the liquid crystal capacitor C1 are charged completely to establish an electric field, and a new moment is formed. However, the gray scale of the display image of the display panel 1 does not reach 80 at the time t2, it is not until the time t3 that the liquid crystal molecules complete their rotation under the action of the moment, so that the gray scale of the display image of the display panel 1 reaches 80.

As illustrated in FIG. 3, the frequency of the display signal is 60 Hz. Assuming that the gray scale of the first frame on the display panel 1 is 20 before the time t1, a gray scale of the display signal of the second frame is 80, the gray scale of the data signal transmitted on the data line 12 is greater than the gray scale of the display signal when the overdriving method is adopted. For example, the gray level of the data signal finally transmitted on the data line 12 is 85. It can be understood that, when the data signal charges the pixel circuit 14, because the applied voltage is great, the new moment is also great, so that the liquid crystal molecules can complete rotation at the time t2, in other words, the response time of the liquid crystal molecules is shortened. The gray scale of the data signal transmitted on the data line 12 is restored to 80 at the time t2, so that the rotation of the liquid crystal molecules is stopped, and the gray scale of the display image of the display panel 1 is maintained at 80, thereby shortening the response time of the liquid crystal molecules and weaken the smear of the display image with the overdriving method.

When the frequency of the display signal is 120 Hz, as illustrated in FIG. 4, it is assumed that the display grayscale of the first frame on the display panel 1 is 20 before the time t1, and a gray scale of the display signal of the second frame is 80. When the overdriving method is adopted. Since a duration of one frame of 120 Hz is half of a duration of one frame of 60 Hz, the gray scale of the data signal finally transmitted on the data line 12 is greater than the gray scale of the display signal, and is required to be greater than the gray scale of the data signal using the overdriving method when the frequency of the display signal is 60 Hz. For example, the gray scale of the data signal finally transmitted on the data line 12 is 90. By the same reasoning, the grayscale of the data signal transmitted on the data line 12 is restored to 80 at the time t2, so that the rotation of the liquid crystal molecules is stopped, and the grayscale of the display image of the display panel 1 is maintained at 80. Compared with the embodiment illustrated in FIG. 3, the embodiment illustrated in FIG. 4 can further achieve shorten the response time of the liquid crystal molecules and weaken smear of the display image.

However, when the frequency of the display signal is 60 Hz and the overdriving method is adopted, assuming that the gray scale of the display signal is 80, the gray scale of the data signal finally transmitted on the data line 12 is greater than the gray scale of the display signal, and is greater than the gray scale of the data signal using the overdriving method when the frequency of the display signal is 60 Hz. For example, the gray level of the data signal finally transmitted on the data line 12 is 90, and the liquid crystal molecules may be overrotated under the effect of new moment, resulting in that the gray scale displayed by the display panel 1 is too large. That is to say, in the related art, when an overdriving method is used for driving, the frequency of the display signal needs to match with the grayscale of the data signal finally transmitted on the data line 12.

In the present embodiment, when the first switch unit T1 is turned on under loading of the scan signal transmitted on the first scan line 11, and the second switching unit T2 is turned on under loading of the scan signal transmitted on the second scan line 15, the data signal transmitted on the data line 12 charges the liquid crystal capacitor C1, the storage capacitor C2 and the neutralizing capacitor C3 at the same time. When the first switch unit T1 is turned on under loading of the scan signal transmitted on the first scan line 11, and the second switching unit T2 is turned off under loading of the scan signal transmitted on the second scan line 15, the data signal transmitted on the data line 12 charges only the liquid crystal capacitor C1 and the storage capacitor C2. In this way, capacitances of the liquid crystal capacitor C1, the storage capacitor C2 and the neutralizing capacitor C3 can be different, and thus in the process of charging the pixel circuit 14, the charged liquid crystal capacitor C1, the charged storage capacitor C2 and the charged neutralizing capacitor C3 can be neutralized, so that a voltage corresponding to a gray scale of the display signal can be reached. Therefore, in the case where the frequency of the display signal is relatively low, the display panel 1 can also be overdriven at a high voltage, so that the display panel 1 can display images at a high frequency. For example, the first frequency is 120 Hz, and the second frequency is 60 Hz. It should be understood that, in other possible embodiments, the first frequency and the second frequency may also be other values, which is not limited in the present disclosure, as long as the first frequency is greater than the second frequency.

It can be understood that, in the present embodiment, with aid of the neutralizing capacitor C3, when the first switch unit T1 is turned off and the second switching unit T2 is turned on, the charges of the liquid crystal capacitor C1, the storage capacitor C2 and the neutralizing capacitor C3 is neutralized, so that the display panel 1 can display images at a relative high first frequency by using a display signal of a relative low second frequency. In addition, since the frequency of the display signal is low, the display panel 1 can be driven to display by using a chip with a low specification, thereby reducing the cost.

Figure 5:
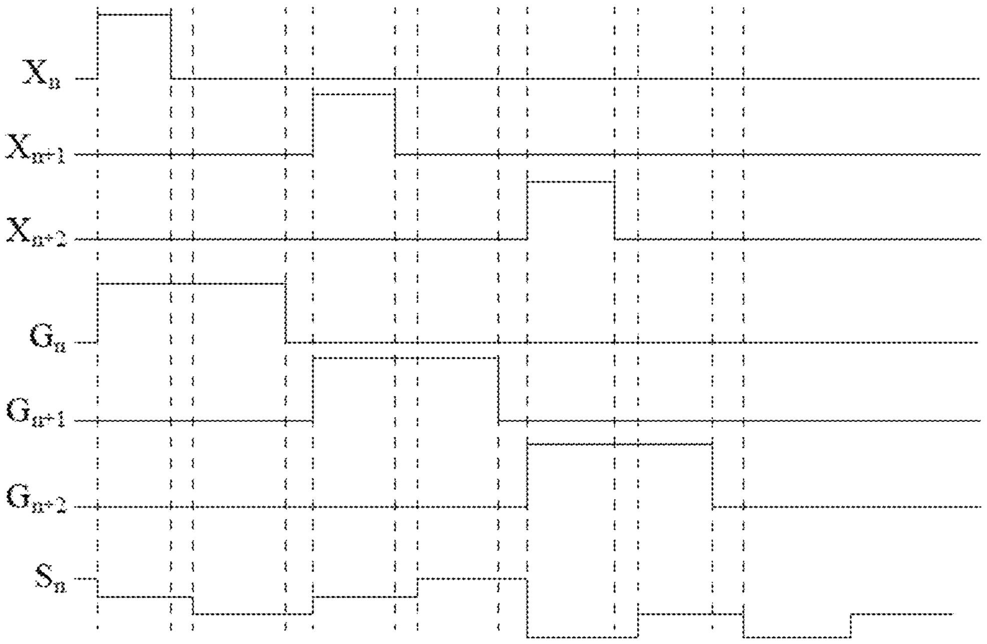
FIG. 5 is a schematic diagram of a signal waveform provided in an embodiment of the present disclosure.

Reference is made to FIGS. 1 and 5 together, where FIG. 5 is a schematic diagram of a signal waveform provided in an embodiment of the present disclosure. In a possible embodiment, the display panel 1 further includes a first scan driver circuit 16, a second scan driver circuit 17, and a data driver circuit 18. In the process of charging a row of the pixel circuits 14, the control circuit 13 is configured to control the first scan driver circuit 16 to generate a first scan signal according to the display signal, and control the second scan driver circuit 17 to generate a second scan signal according to the display signal. The first scan signal is transmitted is transmitted on the first scan line 11 and the second scan signal is transmitted on the second scan line 15. When the first switch unit T1 is turned on under loading of the first scan signal and the second switch unit is turned on T1 simultaneously under loading of the second scan signal, the control circuit 13 is configured to control, according to the display signal, the data driver circuit 18 to generate a first data signal. The first data signal is transmitted on the data line 12 and is used to charge the liquid crystal capacitor C1, the storage capacitor C2, and the neutralizing capacitor C3. When the first switch unit T1 is turned on under loading of the first scan signal and the second switch unit T2 is turned off under loading of the second scan signal, the control circuit 13 is configured to control, according to the display signal, the data driver circuit 18 to generate a second data signal. The second data signal is transmitted on the data line 12 and is used to charge the liquid crystal capacitor C1 and the storage capacitor C2. A voltage of the first data signal is different from a voltage of the second data signal It may be noted that, as illustrated in FIG. 5, "Xn" denotes a signal waveform of the second scan signal of the $n^{th}$ row, "Gn" denotes a signal waveform of the first scan signal of the $n^{th}$ row, and "Sn" denotes a waveform of the data signal of the $n^{th}$ column. Generally, the data signal transmitted on the data line 12 charges the liquid crystal capacitor C1 and the storage capacitor C2 in each pixel circuit 14 in a row-by-row manner by scanning, so as to display a frame. In the present embodiment, in the process of charging a row of the pixel circuits 14, the first data signal charges the liquid crystal capacitor C1, the storage capacitor C2, and the neutralizing capacitor C3. Then, the second switch unit T2 is turned off under loading of the second scan signal, and the second data signal charges only the liquid crystal capacitor C1 and the storage capacitor C2. Since the first data signal and the second data signal have different voltages, the storage capacitor C1, the storage capacitor C2, and the neutralizing capacitor C3 have different capacitances. In this way, when the first switch T1 is turned off and the second switch T2 is turned on, charges of the liquid crystal capacitor C1, the storage capacitor C2, and the neutralizing capacitor C3 are neutralized.

In a possible embodiment, the display signal has a charging voltage, the voltage of the first data signal is less than the charging voltage, and the voltage of the second data signal is greater than the charging voltage.

In the present embodiment, for example, a gray scale corresponding to a charging voltage of the display signal is 80, a voltage of the first data signal is less than the charging voltage, a gray scale corresponding to the first data signal is 78, a voltage of the second data signal is greater than the charging voltage, and a gray scale corresponding to the second data signal is 90. That is to say, in the process of charging a row of pixel circuits 14, the first data signal charges the liquid crystal capacitor C1, the storage capacitor C2, and the neutralizing capacitor C3. A Voltage of the liquid crystal capacitor C1, the storage capacitor C2, and the neutralizing capacitor C3 correspond to a gray scale of 78. Then, the second switch unit T2 is turned off under loading of the second scan signal, and the gray scale corresponding to the voltage of the neutralizing capacitor C3 is maintained at 78, the second data signal charges the liquid crystal capacitor C1 and the storage capacitor C2, and a grayscale corresponding to a voltage of the liquid crystal capacitor C1 and the storage capacitor C2 is 90. That is, an overdriving method is adopted, which shortens the response time of the liquid crystal capacitor C1 and the storage capacitor C2. Finally, at a corresponding moment, the first switching unit T1 is turned off under loading of the first scan signal, the second switching unit T2 is turned on under loading of the second scan signal, and charges of the liquid crystal capacitor C1, the storage capacitor C2, and the neutralizing capacitor C3 are neutralized, so that an voltage of the liquid crystal capacitor C1, the storage capacitor C2, and the neutralizing capacitor C3 correspond to a gray scale of 80 and thus the display panel 1 can display an image of a correct grayscale.

It may be understood that, in the present embodiment, even if the frequency of the display signal is low, the charges of the liquid crystal capacitor C1, the storage capacitor C2, and the neutralizing capacitor C3 can be neutralized at the corresponding time with the arrangement of the neutralizing capacitor C3, and a driving manner having a waveform the same as the waveform illustrated in FIG. 4 can be implemented, that is, the display panel 1 can display at a higher frequency.

In a possible embodiment, the display panel 1 includes N rows of pixel circuits 14. When the first data signal charges the pixel circuits 14 in the $n^{th}$ row, in a first row of pixel circuits 14 to an Nth row of pixel circuits 14 in the second direction D2, second switch units T2 are sequentially turned on under loading of the second scan signal and first switch units T1 are turned off under loading of the first scan signal, charges of the liquid crystal capacitors C1, the storage capacitors C1, and the neutralizing capacitors C1 are neutralized.

It may be noted that, in the process of charging the pixel circuits 14 in a row, the first data signal charges the liquid crystal capacitors C1, the storage capacitors C2, and the neutralizing capacitors C3, and then the second data signal charges the liquid crystal capacitors C1 and the storage capacitors C2, so as to complete the charging of the pixel circuits 14 in a row. At this time, since the second switch unit T2 is turned off under loading of the second scan signal, charges of the charged liquid crystal capacitor C1, the charged storage capacitor C2, and the charged neutralizing capacitor C3 are not neutralized.

In the present embodiment, when the first data signal charges the pixel circuits 14 in the $n^{th}$ row, in a first row of pixel circuits 14 to an Nth row of pixel circuits 14 in the second direction, second switch units T2 are sequentially turned on under loading of the second scan signal and first switch units T1 are turned off under loading of the first scan signal, charges of the liquid crystal capacitors C1, the storage capacitors C2, and the neutralizing capacitors C3 are neutralized, so that the display panel 1 displays images at a higher frequency.

For example, the frequency of the display signal is 60 Hz, and the display panel 1 includes 2250 rows of pixel circuits 14. When the first data signal charges the pixel circuits 14 in the 1125th row, the second switching unit T2 in the first row is turned on under loading of the second scan signal, the first switch unit T1 in the first row is still turned off under loading of the first scan signal, and at this time, charges of the liquid crystal capacitor C1, the storage capacitor C2 and the neutralizing capacitor C3 are neutralized, a waveform of an overdriving signal as illustrated in FIG. 4 can be achieved, and the frequency of the display image of the display panel 1 is 120 Hz. As a result, the display panel 1 can be driven to display an image at a relative high frequency by using a display signal of a relative low frequency.

It can be understood that, since the capacitance of a parasitic capacitor on the data line 12 generally has a large capacitance, when the display panel 1 is driven to display by using the overdriving method as illustrated in FIG. 4, the pixel circuit 14 needs to be charged twice through the data line 12, resulting in a large amount of power loss. In the present embodiment, with the arrangement of the neutralizing capacitor C3, the charges of the liquid crystal capacitor C1, the storage capacitor C2 and the neutralizing capacitor C3 is neutralized and the data signal transmitted on the data line 12 is prevented from re-charging the pixel circuit 14, thereby saving the power consumption. In addition, the same overdriving method as that illustrated in FIG. 4 can also be implemented, such that the display panel 1 can be driven to display an image at a relative high frequency by using a display signal of a relative low frequency.

In a possible embodiment, the first frequency and the second frequency have a calculation relationship: F1=N*F2/n. $F_1$ represents the first frequency, and $F_2$ represents the second frequency.

In the present embodiment, for example, the frequency of the display signal is 60 Hz. When the display panel 1 includes 2250 rows of the pixel circuits 14, in order to achieve display of the display panel 1 at 120 Hz, when the first data signal is used to charge the pixel circuit 14 in the 1125th row, in a first row of pixel circuits to an 2250th row of pixel circuits in the second direction D2, second switch units T2 in the pixel circuits are sequentially turned on under loading of the second scan signal. In this way, a waveform of the overdriving signal is equivalent to that illustrated in FIG. 4.

By the same reasoning, the display panel 1 may also display images at a higher frequency, for example, the frequency of the display signal is 60 Hz, the display panel 1 includes 2250 rows of the pixel circuits 14, when the first data signal charges the pixel circuits 14 in the 750th row, according to the calculation relationship between the first frequency and the second frequency, the second switch units T2 in a first row of pixel circuits to the 2250th row of pixel circuits in the second direction D2 are turned on sequentially under loading of the second scan signal, so that the display panel 1 can display at 180 Hz. Accordingly, the voltages of the first data signal and the second data signal also need to be changed. For example, when the grayscale of the display signal is 80, a grayscale corresponding to the voltage of the first data signal is 77, a grey scale value corresponding to the voltage of the second data signal is 95, so that after charges of the liquid crystal capacitor C1, the storage capacitor C2 and the neutralizing capacitor C3 are neutralized, a voltage of the liquid crystal capacitor C1, the storage capacitor C2 and the neutralizing capacitor C3 can reach a voltage corresponding to a gray scale of 80.

That is to say, as long as a voltage of the liquid crystal capacitor C1, the storage capacitor C2 and the neutralizing capacitor C3, after charges of the liquid crystal capacitor C1, the storage capacitor C2 and the neutralizing capacitor C3 are neutralized, reaches a voltage of the gray scale corresponding to the display signal, the first frequency and the second frequency may be randomly combined according to the calculation relationship. For example, the frequency of the display signal is 60 Hz, and the display panel 1 may display at 240 Hz, i.e., four times of the frequency of 60 Hz, or display at 300 Hz, i.e., five times of the frequency of 60 Hz, etc., which is not limited in the present disclosure.

It can be understood that, in the present embodiment, with the arrangement of the neutralizing capacitor C3, the charges of the liquid crystal capacitor C1, the storage capacitor C2, and the neutralizing capacitor C3 are neutralized, and the data signal transmitted on the data line 12 is prevented from re-charging the pixel circuit 14, thereby saving the power consumption and lowering the charging difficulty. In addition, the liquid crystal capacitor C1, the storage capacitor C2, and the neutralizing capacitor C3 are more likely to be charged to saturation.

Figure 6:
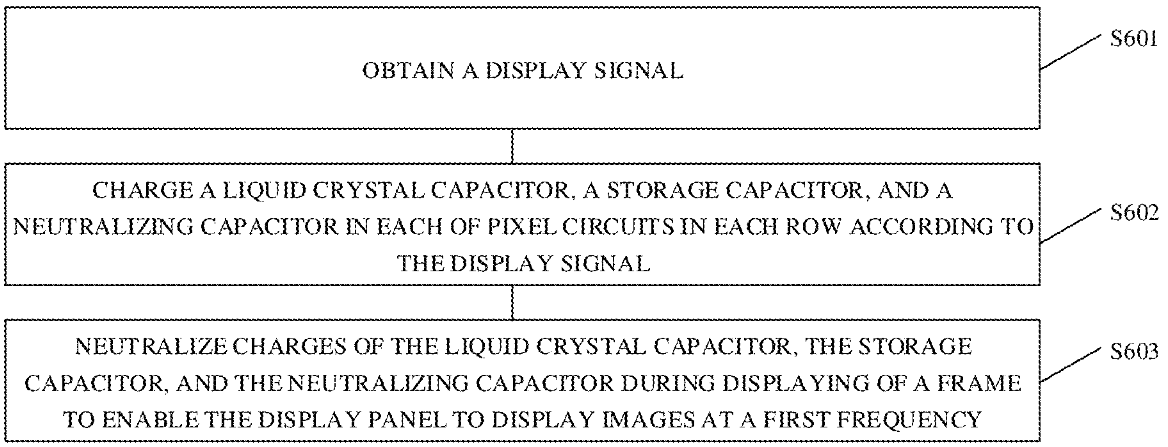
FIG. 6 is a flowchart illustrating a driving method for a display panel provided in an embodiment of the present disclosure.

The present disclosure further provides a driving method for a display panel, which is applicable to the display panel 1 as described above. FIG. 6 is a flowchart illustrating a driving method for a display panel provided in an embodiment of the present disclosure. The driving method for the display panel includes operations at S601, S602 and S603, where the details of the operations at S601, S602 and S603 are described as follows.

At S601, a display signal is obtained.

At S602, a liquid crystal capacitor, a storage capacitor, and a neutralizing capacitor are charged in each row of pixel circuits according to the display signal.

At S603, during displaying of a frame, charges of the liquid crystal capacitor, the storage capacitor, and the neutralizing capacitor are neutralized, to enable the display panel to display images at a first frequency.

The display signal has a second frequency, and the first frequency is greater than the second frequency.

Specifically, for the display panel 1, the display signal, the pixel circuit 14, the liquid crystal capacitor C1, the storage capacitor C2, the neutralizing capacitor C3, the first frequency, and the second frequency, reference may be made to the description above, and details are not repeated herein.

It should be appreciated that, in the present embodiment, the charge of the liquid crystal capacitor C1, the storage capacitor C2 and the neutralizing capacitor C3 is neutralized with the arrangement of the neutralizing capacitor C3, so that the display panel 1 can display images at a relatively high first frequency by using a display signal of a relatively low second frequency.

In a possible embodiment, the driving method for the display panel further includes the following. In a process of charging a row of pixel circuits, a first data signal is generated according to the display signal to charge the liquid crystal capacitor, the storage capacitor, and the neutralizing capacitor, and a second data signal is generated according to the display signal to charge the liquid crystal capacitor and storage capacitor. A voltage of the first data signal is different from a voltage of the second data signal.

Specifically, for the first data signal and the second data signal, reference may be made to the foregoing description, and details are not repeatedly described herein.

It can be understood that, in the present embodiment, since the first data signal and the second data signal have different voltages, the capacitances of the liquid crystal capacitor C1, the storage capacitor C2 and the neutralizing capacitor C3 are different, so that charges of the liquid crystal capacitor C1, the storage capacitor C2, and the neutralizing capacitor C3 can be neutralized.

In a possible embodiment, the display signal has a charging voltage, the voltage of the first data signal is less than the charging voltage, and the voltage of the second data signal is greater than the charging voltage.

Specifically, for the charging voltage, reference may be made to the foregoing description, and details are not repeatedly described herein.

It may be understood that, in the present embodiment, even if the frequency of the display signal is low, the charges of the liquid crystal capacitor C1, the storage capacitor C2 and the neutralizing capacitor C3 can be neutralized at the corresponding time with the arrangement of the neutralizing capacitor C3, and a driving manner having a waveform the same as the waveform illustrated in FIG. 4 can be implemented, that is, the display panel 1 can display at a higher frequency.

In a possible embodiment, the driving method for the display panel further includes the following. When the first data signal charges the pixel circuit 14 in the $n^{th}$ row, in a first row of pixel circuits to an Nth row of pixel circuits 14 in the second direction, second switch units T2 are sequentially turned on under loading of the second scan signal and first switch units T1 are turned off under loading of the first scan signal.

Specifically, for the first switch unit T1, the second switch unit T2, the first scan signal, and the second scan signal, reference may be made to the description above, and details are not repeated herein.

It can be understood that, since the capacitance of a parasitic capacitor on the data line 12 generally has a large capacitance, when the display panel 1 is driven to display by using the overdriving method as illustrated in FIG. 4, the pixel circuit 14 needs to be charged twice through the data line 12, resulting in a large amount of power loss. In the present embodiment, with the arrangement of the neutralizing capacitor C3, the charges of the liquid crystal capacitor C1, the storage capacitor C2 and the neutralizing capacitor C3 is neutralized and the data signal transmitted on the data line 12 is prevented from re-charging the pixel circuit 14, thereby saving the power consumption. In addition, the same overdriving method as that illustrated in FIG. 4 can also be implemented, such that the display panel 1 can be driven to display an image at a relative high frequency by using a display signal of a relative low frequency.

Figure 7:
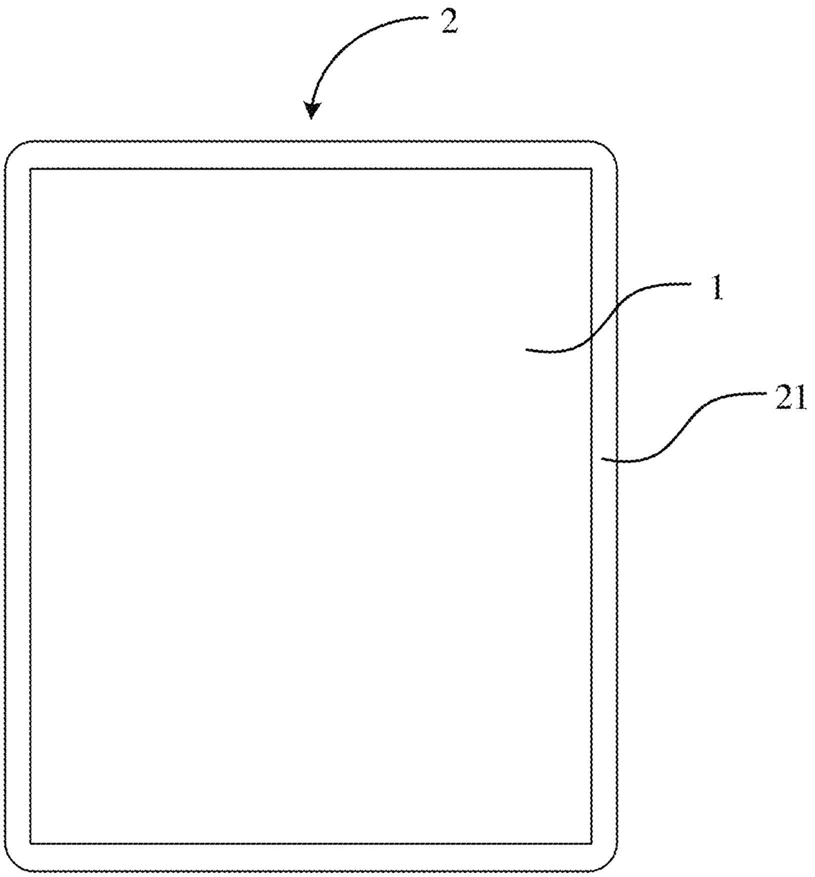
FIG. 7 is a schematic top view of an electronic device provided in an embodiment of the present disclosure.

The present disclosure further provides an electronic device 2. Reference is made to FIG. 7, which is a schematic top view of the electronic device provided in an embodiment of the present disclosure. The electronic device 2 includes a housing 21 and the display panel 1 as described above. The housing 21 is configured to carry the display panel 1. Specifically, for the display panel 1, reference may be made to the foregoing description, and details are not repeatedly described herein.

It may be noted that, the electronic device 2 in the embodiment of the present disclosure may be an electronic device 2 such as a television, a mobile phone, a smartphone, a tablet computer, an e-reader, a wearable portable device, and a notebook computer. The electronic device 2 may communicate with a data transfer server via the Internet, where the data transfer server may be an instant messaging server or a social networking service (SNS) server, etc., which is not limited in embodiments of the present disclosure.

It can be understood that, in the present embodiment, with aid of the neutralizing capacitor C3, when the first switch unit T1 is turned off and the second switching unit T2 is turned on, the charges of the liquid crystal capacitor C1, the storage capacitor C2 and the neutralizing capacitor C3 is neutralized, so that the display panel 1 can display images at a relative high first frequency by using a display signal of a relative low second frequency. In addition, since the frequency of the display signal is low, the display panel 1 can be driven to display by using a chip with a low specification, thereby reducing the cost.

Principles and implementations of the disclosure are elaborated with specific embodiments herein. The illustration of implementations above is only used to help understanding of methods and core ideas of the disclosure. At the same time, for those of ordinary skill in the art, according to ideas of the present disclosure, there will be changes in the specific implementations and application scopes. In summary, contents of this specification should not be understood as limitation on the present disclosure.

What is claimed is:

1. A display panel, comprising a plurality of first scan lines extending in a first direction, a plurality of data lines extending in a second direction, a control circuit, and a plurality of pixel circuits defined by intersection of the plurality of first scan lines and the plurality of data lines, wherein each of the plurality of pixel circuits comprises a first switch unit, a liquid crystal capacitor, and a storage capacitor, a control terminal of the first switch unit is electrically connected to one of the plurality of first scan lines, a first terminal of the first switch unit is electrically connected to one of the plurality of data lines, a second terminal of the first switch unit is electrically connected to one terminal of the liquid crystal capacitor and one terminal of the storage capacitor, the other terminal of the liquid crystal capacitor is electrically connected to a first common electrode, and the other terminal of the storage capacitor is electrically connected to a second common electrode;

wherein the display panel further comprises a plurality of second scan lines extending in the first direction, each of the plurality of pixel circuits further comprises a second switch unit and a neutralizing capacitor, a control terminal of the second switch unit is electrically connected to one of the plurality of second scan lines, a first terminal of the second switch unit is electrically connected to the second terminal of the first switch unit, a second terminal of the second switch unit is electrically connected to one terminal of the neutralizing capacitor, and the other terminal of the neutralizing capacitor is electrically connected to the second common electrode; and the control circuit is configured to obtain a display signal and charge each row of liquid crystal capacitors, storage capacitors, and neutralizing capacitors according to the display signal and neutralize charges of the liquid crystal capacitor, the storage capacitor, and the neutralizing capacitor during displaying of a frame to enable the display panel to display images at a first frequency, the display signal has a second frequency, and the first frequency is greater than the second frequency.

2. The display panel of claim 1, further comprising a first scan driver circuit, a second scan driver circuit, and a data driver circuit, wherein in a process of charging a row of pixel circuits, the control circuit is configured to control, according to the display signal, the first scan driver circuit to generate a first scan signal, the first scan signal is transmitted on each of the plurality of first scan lines, the control circuit is further configured to control, according to the display signal, the second scan driver circuit to generate a second scan signal, and the second scan signal is transmitted on each of the plurality of second scan lines; when the first switch unit is turned on under loading of the first scan signal and the second switch unit is turned on simultaneously under loading of the second scan signal, the control circuit is configured to control, according to the display signal, the data driver circuit to generate a first data signal, and the first data signal is transmitted on each of the plurality of data lines and is used to charge the liquid crystal capacitor, the storage capacitor, and the neutralizing capacitor; when the first switch unit is turned on under loading of the first scan signal and the second switch unit is turned off under loading of the second scan signal, the control circuit is configured to control, according to the display signal, the data driver circuit to generate a second data signal, and the second data signal is transmitted on each of the plurality of data lines and is used to charge the liquid crystal capacitor and the storage capacitor; and wherein a voltage of the first data signal is different from a voltage of the second data signal.

3. The display panel of claim 2, wherein the display signal has a charging voltage, the voltage of the first data signal is less than the charging voltage, and the voltage of the second data signal is greater than the charging voltage.

4. The display panel of claim 2, wherein the display panel comprises N rows of pixel circuits, and when the first data signal is used to charge pixel circuits in an nth row, in a first row of pixel circuits to an Nth row of pixel circuits in the second direction, second switch units are sequentially turned on under loading of the second scan signal and first switch units are turned off under loading of the first scan signal, charges of the liquid crystal capacitor, the storage capacitor, and the neutralizing capacitor are neutralized.

5. The display panel of claim 4, wherein the first frequency and the second frequency have a calculation relationship:

$$F_1 = N * F_2 / n;$$

wherein $F_1$ represents the first frequency, and $F_2$ represents the second frequency.

6. A driving method for a display panel, applicable to a display panel of claim 1 and comprising:

obtaining a display signal;

charging a liquid crystal capacitor, a storage capacitor, and a neutralizing capacitor in each of pixel circuits in each row according to the display signal; and neutralizing charges of the liquid crystal capacitor, the storage capacitor, and the neutralizing capacitor during displaying of a frame to enable the display panel to display images at a first frequency;

wherein the display signal has a second frequency, and the first frequency is greater than the second frequency.

7. The method for driving a display panel of claim 6, further comprising:

in a process of charging a row of pixel circuits:

generating a first data signal according to the display signal to charge the liquid crystal capacitor, the storage capacitor, and the neutralizing capacitor; and generating a second data signal according to the display signal to charge the liquid crystal capacitor and storage capacitor;

wherein a voltage of the first data signal is different from a voltage of the second data signal.

8. The method for driving a display panel of claim 7, wherein the display signal has a charging voltage, the voltage of the first data signal is less than the charging voltage, and the voltage of the second data signal is greater than the charging voltage.

9. The method for driving a display panel of claim 7, further comprising:

when the first data signal charges pixel circuits in an nth row, in a first row of pixel circuits to an Nth row of pixel circuits in the second direction, sequentially turning on second switch units under loading of the second scan signal and turning off first switch units under loading of the first scan signal.

10. An electronic device comprising a housing and a display panel, the housing being configured to carry the display panel, the display panel comprising a plurality of first scan lines extending in a first direction, a plurality of data lines extending in a second direction, a control circuit, and a plurality of pixel circuits defined by intersection of the plurality of first scan lines and the plurality of data lines, wherein each of the plurality of pixel circuits comprises a first switch unit, a liquid crystal capacitor, and a storage capacitor, a control terminal of the first switch unit is electrically connected to one of the plurality of first scan lines, a first terminal of the first switch unit is electrically connected to one of the plurality of data lines, a second terminal of the first switch unit is electrically connected to one terminal of the liquid crystal capacitor and one terminal of the storage capacitor, the other terminal of the liquid crystal capacitor is electrically connected to a first common electrode, and the other terminal of the storage capacitor is electrically connected to a second common electrode; wherein the display panel further comprises a plurality of second scan lines extending in the first direction, each of the plurality of pixel circuits further comprises a second switch unit and a neutralizing capacitor, a control terminal of the second switch unit is electrically connected to one of the plurality of second scan lines, a first terminal of the second switch unit is electrically connected to the second terminal of the first switch unit, a second terminal of the second switch unit is electrically connected to one terminal of the neutralizing capacitor, and the other terminal of the neutralizing capacitor is electrically connected to the second common electrode; and the control circuit is configured to obtain a display signal and charge each row of liquid crystal capacitors, storage capacitors, and neutralizing capacitors according to the display signal and neutralize charges of the liquid crystal capacitor, the storage capacitor, and the neutralizing capacitor during displaying of a frame to enable the display panel to display images at a first frequency, the display signal has a second frequency, and the first frequency is greater than the second frequency.

11. The electronic device of claim 10, wherein the display panel further comprises a first scan driver circuit, a second scan driver circuit, and a data driver circuit; in a process of charging a row of pixel circuits, the control circuit is configured to control, according to the display signal, the first scan driver circuit to generate a first scan signal, the first scan signal is transmitted on each of the plurality of first scan lines, the control circuit is further configured to control, according to the display signal, the second scan driver circuit to generate a second scan signal, and the second scan signal is transmitted on each of the plurality of second scan lines; when the first switch unit is turned on under loading of the first scan signal and the second switch unit is turned on simultaneously under loading of the second scan signal, the control circuit is configured to control, according to the display signal, the data driver circuit to generate a first data signal, and the first data signal is transmitted on each of the plurality of data lines and is used to charge the liquid crystal capacitor, the storage capacitor, and the neutralizing capacitor; when the first switch unit is turned on under loading of the first scan signal and the second switch unit is turned off under loading of the second scan signal, the control circuit is configured to control, according to the display signal, the data driver circuit to generate a second data signal, and the second data signal is transmitted on each of the plurality of data lines and is used to charge the liquid crystal capacitor and the storage capacitor; and wherein a voltage of the first data signal is different from a voltage of the second data signal.

12. The electronic device of claim 11, wherein the display signal has a charging voltage, the voltage of the first data signal is less than the charging voltage, and the voltage of the second data signal is greater than the charging voltage.

13. The electronic device of claim 11, wherein the display panel comprises N rows of pixel circuits, and when the first data signal is used to charge pixel circuits in an nth row, in a first row of pixel circuits to an Nth row of pixel circuits in the second direction, second switch units are sequentially turned on under loading of the second scan signal and first switch units are turned off under loading of the first scan signal, charges of the liquid crystal capacitor, the storage capacitor, and the neutralizing capacitor are neutralized.

14. The electronic device of claim 13, wherein the first frequency and the second frequency have a calculation relationship:

$$F_1 = N * F_2 / n;$$

wherein $F_1$ represents the first frequency, and $F_2$ represents the second frequency.

* * * * *